(No Model.)

W. R. MIDDLETON.
STEAM COCK.

No. 276,618. Patented May 1, 1883.

Witnesses. Inventor.
J. W. Burridge W. R. Middleton
Calvin L. Sutliff per W. H. Burridge
Atty.

N. PETERS, Photo-Lithographer, Washington, D. C.

UNITED STATES PATENT OFFICE.

WILLIAM R. MIDDLETON, OF CLEVELAND, OHIO.

STEAM-COCK.

SPECIFICATION forming part of Letters Patent No. 276,618, dated May 1, 1883.

Application filed December 18, 1882. (No model.)

*To all whom it may concern:*

Be it known that I, WILLIAM R. MIDDLETON, of Cleveland, in the county of Cuyahoga and State of Ohio, have invented a certain new and Improved Steam-Cock; and I do hereby declare that the following is a full, clear, and complete description thereof.

The following is a description of the construction and operation of the steam-cock above alluded to, reference being had to the annexed drawings for illustration, and making a part of this specification, in which—

Figure 1:
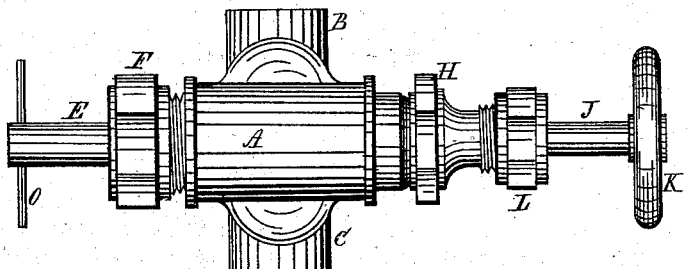
Figure 2:
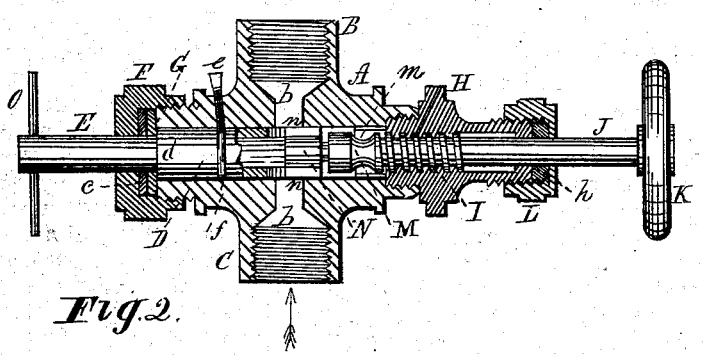
Figure 3:
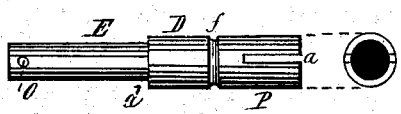
Figure 4:
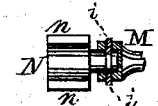
Figures 5, 7:
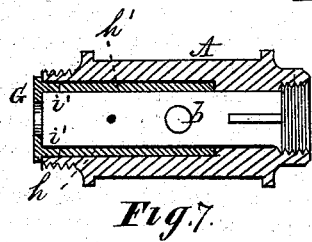
Figure 6:
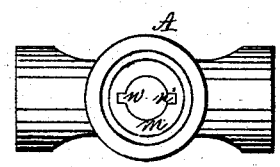

Figure 1 represents a side view of the cock. Fig. 2 shows a longitudinal section. Fig. 3 is a detached view of the steam-cock key. Fig. 4 represents the connection of a slide to the hollow head, hereinafter described. Figs. 5 and 6 are detached sections of the steam-cock described in the following specification. Fig. 7 is a longitudinal section of the cock-cylinder, taken through the width of the packing-strips, more fully described hereinafter.

Like letters of reference refer to like parts in the several views.

The body of the cock above alluded to consists of a hollow cylinder, A, having on two opposite sides thereof, respectively, the tubular projections B and C, which have a direct communication with each other through the cylinder, as seen in Fig. 2.

In one end of the cylinder A is closely fitted a plug or key, D, a detached view of which is shown in Fig. 3, in which it will be observed that the end of the plug is hollow and slotted in two of its opposite sides, as seen at *a*, Fig. 3. The plug is represented in the drawings as being straight. It is preferred, however, to have it slightly tapering, that it may be ground in the cylinder to secure a steam-tight fit. It will be noticed that the plug is so far inserted in the cylinder as to extend beyond the passage-way *b*, so as to close it when turned in the proper direction for that purpose, and for opening the same by bringing the slots *a* in open relation therewith. The outer end of the plug is smaller than the body, forming a stem, E, which is made steam-tight in its connection with the cylinder by the screw-cap F and packing *c*, resting upon a ring, G, interposed between the said packing and the end of the cylinder to form a solid metal surface for the shoulder *d* of the plug to turn on, and also for another purpose, hereinafter explained. The plug is prevented from passing farther into the cylinder than is shown in the drawings by a set-screw, *e*, inserted through the side of the cylinder to an annular groove, *f*, in which the point of the screw is received, allowing the plug to turn in the cylinder, but not to pass farther therein, as afore remarked.

In the opposite end of the cylinder is screwed a nut, H, in which is fitted a screw, I, formed on the stem J, and by which the screw is operated by the hand-wheel K. The stem of the screw is made tight-fitting in the nut H by a screw-cap, L, and packing *h*, as shown in Fig. 2. The inner end of the screw is provided with a hollow head, M, in which is loosely fitted the stem of a slide, N. The connection of the stem of the slide with the head is by means of pins *i*, inserted in the head through to an annular groove in the said stem, in which projects the pins, as shown in Fig. 4. By this means the stem is allowed to rotate in the head of the screw, and is also prevented thereby from being pulled out the head.

The slide N, above alluded to, consists of a center adapted to fit closely but freely in the hollow of the plug D, as seen in Figs. 2 and 5. On each side of the center projects a wing, *n*, Fig. 4, adapted to fit closely and slide in the slots *a* of the plug, as shown in Figs. 2 and 5.

Practically the operation of the above-described steam-cock is as follows: The cock is inserted in a steam-pipe at any desired place between the boiler or steam-generator and the place to which the steam is to be conducted. To this end the steam pipe or pipes are screwed into the projections B and C. That steam may be allowed to pass through the cock from C to B, or *per contra*, the plug D, by means of the handle O, is turned so as to bring said handle parallel with the steam pipe or projections B and C. This will bring the slots *a* of the plug facing the steam-passage *b*, as seen in Fig. 2, in which the slots are shown partly in open relation therewith, allowing a certain amount of steam to pass through. If more steam is needed, the slide N is drawn down farther to the end of the plug by means of the screw I. This will bring more or less of the length of the slot *a* in open relation with the steam-passage as the wings and center of the slide are moved more or less down. A full head of steam is let on by drawing the slide wholly from before the steam-passage. To prevent the slide from being drawn entirely out of the plug, the wings of the slide will impinge upon the shoulder m, formed on the inner surface of the cylinder by an enlargement of the bore thereof, as seen in Fig. 2. The slide is inserted in the cylinder by passing the wings n thereof through the corresponding grooves, n', Fig. 6, while the center of the slide and the head M pass into the cylinder through the smaller part of the bore seen in said figure.

From the above it will be obvious that any amount of steam ranging from a full head to an entire shut-off can be allowed to pass through the cock by means of the slide actuated by the screw I, and can be entirely shut off by screwing the slide into the plug so far as to cover the steam-passage. When the steam is shut off by the slide, as above said, the cock is then made all the more secure from leakage by giving the plug one-quarter of a turn, thereby turning the slotted side away from the steam-pipes, so that the blank sides P of the plug may cover the passage, thereby making the cock secure from leaking. Steam, when thus shut off by the cock, cannot be let on again by moving the slide without first turning the plug so as to bring the slots in open relation to the steam passage or pipes, which is done by the handle O, as aforestated. Fig. 2 shows the plug and slide partly in open relation to the steam-pipes, and the position of the plug as shown in Fig. 3 is such as when the cock is closed, and the steam thereby shut off by a quarter-turn of the plug.

That the cock shall be perfectly free from leaking steam when closed is the purpose of the packing h', Fig. 7. Said packing consists of two strips of any proper material of sufficient width and length to cover the slots in the end of the plug and the steam-passage b. The strips of packing are let into the sides of the bore and flush therewith, as shown in Fig. 7, which represents a longitudinal section of the cylinder cutting through the width of the packing.

Grooves are made for the packing, respectively, in the side of the bore between the steam-passage, so that when the plug or key D is given the quarter-turn in the cylinder and the steam is cut off by the slide, as above mentioned, the slots and slide will be covered by the strips of packing, thereby making the cock perfectly steam-tight when the steam-passage is closed.

To cause the two strips of packing to hug closely to the plug is the other purpose, above alluded to, of the ring G, the two inward-projecting slugs i of which fit in the grooves holding the packing, thereby compressing and forcing it against the plug, making a close, tight joint.

What I claim as my invention, and desire to secure by Letters Patent, is—

1. In a regulating steam cock, the combination of the cylinder A and steam-pipe projections with the plug or key D, having a tubular end, and in the sides thereof slots adapted to and arranged in relation to the said steam-pipe projections, as described, and strips of packing and ring G, substantially as and for the purpose set forth.

2. In a regulating steam-cock, in combination with the tubular plug, the slide N, provided with wings adapted to fit and move reciprocally in said tubular plug or key by means of the adjusting-screw I, attached to the slide by a swivel-joint connection, substantially as described, and for the purpose set forth.

3. The cylinder A, having side pipe projections, the tubular slotted plug or key D, secured therein by a set-screw, e, packing, and screw-cap F, in combination with the slide N, adjusting screw-nut H, packing, and nut L, constructed and arranged to operate conjointly in the manner substantially as described, and for the purposes specified.

In testimony whereof I affix my signature in presence of two witnesses.

WILLIAM R. MIDDLETON.

Witnesses:
G. A. WALTER,
G. E. McISAAC.